J. COBERT.
SPLIT PULLEY CLAMP.
APPLICATION FILED NOV. 23, 1916.

1,244,835.

Patented Oct. 30, 1917.

WITNESS
A. C. Fairbanks

INVENTOR.
Joseph Cobert,
BY
Frank A. Cutter,
ATTORNEY.

UNITED STATES PATENT OFFICE.

JOSEPH COBERT, OF NORTHAMPTON, MASSACHUSETTS.

SPLIT-PULLEY CLAMP.

1,244,835.

Specification of Letters Patent. Patented Oct. 30, 1917.

Application filed November 23, 1916. Serial No. 132,985.

*To all whom it may concern:*

Be it known that I, JOSEPH COBERT, a subject of the Czar of Russia, residing at Northampton, in the county of Hampshire and State of Massachusetts, have invented a new and useful Split-Pulley Clamp, of which the following is a specification.

My invention relates to improvements in clamping means for connecting the sections of split pulleys and securing the same to shafts, and consists essentially of a head block adapted to be placed in position on or contiguous to a part of one section of a split pulley that is adjacent to the axis of said pulley, arms pivotally attached to said block and designed to engage parts of the other section of said pulley that also are adjacent to said axis, and a tightening or clamping screw or bolt tapped into and extending through said block and arranged to bear on said first-mentioned part, all as hereinafter set forth.

Heretofore the sections of a split pulley have been fastened together, after being placed on a shaft, by means of a plurality of bolts and nuts, except in some rare cases where split pulleys of special and unusual construction may have been constructed, and such means for fastening the sections together and securing them to the shaft are cumbersome, complicated and awkward, and necessitate the expenditure of much time and labor, both in mounting and in dismounting the pulley. And the primary object of my invention is to provide a clamp which can be applied to a split pulley of ordinary construction, little or no change or alteration of such pulley being required, to the end that the pulley can be mounted on its shaft and removed therefrom easily and quickly, the work being done frequently by a single man.

A further object is to provide a clamp of this kind which is strong and durable and securely holds the pulley sections together and the pulley in place on the shaft.

This clamp does not appreciably affect the balance of the split pulley with which it is used.

Other objects and advantages will appear in the course of the following description.

I attain the objects and secure the advantages of my invention by the means illustrated in the accompanying drawings, in which—

Figure 1:
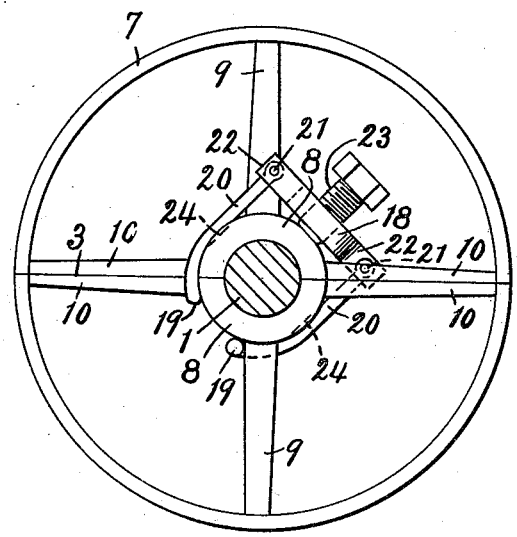
Figure 2:
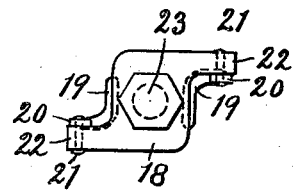

Figure 1 is a side elevation of a clamp, which embodies a practical form of my invention, showing such clamp applied to a split pulley and the latter mounted on a shaft; and Fig. 2, a top plan of said clamp.

Similar reference numerals designate similar parts throughout the several views.

In the first view a shaft is represented at 1, with a split pulley mounted thereon, the cleavage plane or line appearing at 3. Each of the two sections of the pulley comprises a semi-circular rim 7, a hub portion 8, a whole spoke 9 and two half spokes 10, inasmuch as the cleavage line 3 cuts through two of the four spokes which said pulley has when said sections are united. This pulley is of ordinary construction and a fair representation of its type. The pulley might have more than four spokes, and possibly less than that number, and the cleavage line might be changed so as to avoid cutting through any of the spokes, but these changes are of no importance so far as my invention is concerned and do not affect the same in any important particular.

My clamp is capable of being applied to the hub portions 8 of the pulley, on opposite sides of the cleavage line 3, to engage such hub portions forcibly and bind them securely to the shaft 1. The sections of the pulley are thus fastened together and the pulley made up of such sections is made fast to the shaft.

The clamp comprises a head block 18, arms 20—20 pivoted to said block at 21—21, and a screw or bolt 23. The block 18 has offset or diagonally opposite projections 22—22 to which the arms 20 are pivoted at 21. The projections 22 enable the block 18 to be placed on one of the hub portions 8, between the spoke 9 and either of the half spokes 10 connected with said portion, and the arms 20 to pass on opposite sides of said spoke and half spoke. By thus forming the block 18 and arranging the arms 20, the weight of the clamp and the force exerted thereby are more evenly or uniformly distributed than would be the case if both arms extended on the same side of the spokes.

The arms 20 may be curved inwardly or toward each other at their free terminals, which terminals consist in part of oppositely-directed hooks 19—19, the proportions of said arms with their hooks and the arrangement of the same being such that said hooks can be engaged with the spoke 9 and one of the half spokes 10 of one pulley section, when the block 18 is mounted on the hub portion 8 of the other pulley section. When the hooks 19 are in engagement with the spoke 9 and a half spoke of the same section, said hooks enter from opposite directions or opposite sides the space between said spoke and half spoke and adjacent to the hub portion 8 with which said spoke and half spoke are connected.

The split pulley is secured to the shaft 1 in the following manner: One section of the pulley is mounted on the shaft and the block 18 is placed on the hub portion 8 of said section, with the projections 22 and the arms 20 on opposite sides of the spoke 9 and one of the half spokes 10 of such section. The other pulley section is then placed in position. When the second section is placed against the shaft 1 and the first section, it is necessary so to position the block 18, as by turning it to carry its projections away from the adjacent spoke 9 and half spoke 10, that the spoke 9 and the half spoke 10 of said second section, with which the hooks 19 are to be engaged, can clear said hooks. The block 18 is next turned, on the hub portion 8 which supports it, until the arms 20 contact with the adjacent spoke 9 and half spoke 10, which action introduces the hooks 19 into the space between the spoke 9 and one of the half spokes 10 of the second section. The bolt 23 is now screwed tightly against the hub section 8 which supports the block 18, with the result that the hooks 19 are drawn forcibly into the angles or junctions at the places where the spoke 9 and the half spoke 10, which is engaged by one of said hooks, unite with the hub portion 8 of the second section, such angles or junctions being on adjacent edges of said spoke and half spoke. The two sections are thus secured to each other and to the shaft, just as in the other case.

Upon loosening the parts, by unscrewing the bolt 23, and turning the block 18 to remove the hooks 19 from engaging position, the pulley sections can be removed from the shaft in the same manner as before.

If necessary or desirable the hub sections 50 8 may be grooved, as indicated at 24—24, to accommodate to better advantage the arms 20.

It is obvious that more or less change in the shape, size, arrangement, and construction of some or all of the parts and members of my clamp may be required to adapt the same to split pulleys of different sizes and constructions, wherefore I do not desire or intend to limit myself to the construction of the clamp herein shown and described, but reserve the right to any and all modifications which fall within the scope of my claims.

What I claim as my invention, and desire to secure by Letters Patent, is—

1. As an improved article of manufacture, a split-pulley clamp comprising a head block adapted to rest on the hub portion of one pulley section, said block having diagonally-opposite projections consisting in part of oppositely-directed hooks to enter from opposite sides of the pulley and engage the hub portion of the other pulley section, and a threaded member tapped into said head block and adapted to bear on and to be tightened against said first-named hub portion.

2. As an improved article of manufacture, a split-pulley clamp comprising a head block adapted to rest on the hub portion of one pulley section, said block having diagonally-opposite projections, arms pivotally attached to said projections and curved to engage the hub portions of both pulley sections, such terminals consisting in part of oppositely-directed hooks to enter from opposite sides of the pulley and engage the hub portion of the pulley section opposite to that first mentioned, and a threaded member tapped into said head block and adapted to bear on and to be tightened against said first-named hub portion.

JOSEPH COBERT.

Witnesses:
G. H. La Fleur,
F. A. Cutter.

Copies of this patent may be obtained for five cents each, by addressing the "Commissioner of Patents, Washington, D. C."